United States Patent [19]

Kugler et al.

[11] 4,005,352
[45] Jan. 25, 1977

[54] PROTECTION CIRCUIT FOR MAGNETICALLY CONTROLLED D-C TO D-C CONVERTER

[75] Inventors: Jindrich Kugler; Alfred Dvorak, both of Ottawa; Charles John Elliott, Kanata, all of Canada

[73] Assignee: Northern Telecom Limited, Montreal, Canada

[22] Filed: Apr. 5, 1976

[21] Appl. No.: 673,715

[52] U.S. Cl. .................................................. 321/19
[51] Int. Cl.² ...................................... H02M 3/335
[58] Field of Search ........................... 321/2, 18, 19

[56] References Cited
UNITED STATES PATENTS

| | | | |
|---|---|---|---|
| 3,373,337 | 3/1968 | Hung | 321/19 X |
| 3,408,553 | 10/1968 | Bishop | 321/18 X |
| 3,500,168 | 3/1970 | Merritt | 321/18 |
| 3,564,384 | 2/1971 | Adler | 321/18 X |
| 3,667,027 | 5/1972 | Martin | 321/18 X |

Primary Examiner—William M. Shoop
Attorney, Agent, or Firm—John E. Mowle

[57] ABSTRACT

A push-pull d-c to d-c power converter which is regulated by a magnetic amplifier utilizing pulse-width modulation to control the switching elements. The circuit provides stable operation by utilizing separate control windings in the magnetic amplifier for the voltage regulation and the over-current protection. In addition, symmetry control of the switching elements may be integrated with the voltage regulation by the addition of auxiliary control windings to the magnetic amplifier.

5 Claims, 6 Drawing Figures

PROTECTION CIRCUIT FOR MAGNETICALLY CONTROLLED D-C TO D-C CONVERTER

This invention relates to a d-c to d-c power converter regulated by a magnetic amplifier utilizing pulse-width modulation control and more particularly to one which may provide over-current protection or asymmetry correction of switching devices in the converter.

BACKGROUND OF THE INVENTION

Transformer coupled push-pull power converters, which use pulse-width modulation for output regulation, are well known. In such converters, two transistors are alternately switched between saturation and cut-off to supply pulsating d-c current to an output power transformer. The required d-c output voltage is obtained by rectifying and filtering the voltage appearing across the secondary of the transformer. Regulation of the output voltage is obtained by varying the pulse width of the drive signals to the power transistors under control of the output voltage.

To protect the power converters as well as the associated load equipment against possible damage due to short circuits and overloads, an over-current protection circuit is included. When the power converter is used to power communications equipment, two types of protection may be used, fused or unfused. The supply voltage for low voltage logic circuitry (nominally 5 volts) used in such communications equipment, is usually distributed without fusing to avoid the additional voltage drop across the fuse. Since the load is usually constant, there is no problem with overload. However, short circuits may develop in components or wiring used in the equipment. If a converter supplies current in the order of 20 amps or more, an over-current control may be used to avoid burning out portions of the equipment such as the printed circuit boards.

A reliable and simple way to obtain pulse-width modulation control in a d-c to d-c converter is by means of a magnetic amplifier. With such an arrangement, a saturable-core type oscillator generates square-wave pulses at a nominal frequency of say 20 KHz, which are coupled through a transformer to each base of the two power transistors. Saturation of the magnetic amplifier gate windings coupled to the transformer output, results in an effective short-circuit of the drive signal during a portion of each cycle, so that pulse-width modulation control can be obtained by controlling the firing angle of the magnetic amplifier in response to the output voltage or current.

In the past, attempts to regulate both the output voltage and provide over-current protection control through a single control winding in the magnetic amplifier have led to instability and control problems, since both control signals are generally attempting to function in opposite directions. For example, when a short-circuit occurs, the increased load will tend to decrease the output voltage so that the control circuit will respond by attempting to increase the pulse-width of the drive signals to the transistors. However, this will further increase the short-circuit current so that the over-current protection control will attempt to decrease the pulse-width. This may result in hunting or instability in the control signal applied to the control winding of the magnetic amplifier.

STATEMENT OF THE INVENTION

It has been found that by utilizing separate control windings for voltage regulation and over-current protection in the magnetic amplifier to control the pulse-width modulation of the converter, a stable and reliable operation of the overall circuit results.

Thus, in accordance with the present invention there is provided in a pulse-width modulated d-c to d-c converter, a power switching circuit including at least one switching device. In addition, a drive circuit is coupled to the input of the switching device for applying drive signals thereto. The converter includes a magnetic amplifier having a gate winding coupled to the input of the switching device to substantially short-circuit drive signals thereto during saturation of the amplifier so as to alter the duty cycle of the signals. The magnetic amplifier has a first control winding for controlling the saturation thereof as well as a first control circuit which is responsive to the output voltage of the power switching circuit for controlling a first control signal applied to the control winding to vary the firing angle and thus the saturation interval of the magnetic amplifier so as to regulate its output voltage. In addition, the amplifier includes a second control winding also for controlling its saturation and a second control circuit which is responsive to the output current of the power switching circuit for controlling a second control signal applied to the second control winding to vary the firing angle and thus the saturation interval of the magnetic amplifier to limit its output current. In a particular embodiment, the second control circuit is also made responsive to the output voltage which exceeds a particular value so as to vary the firing angle of the magnetic amplifier to limit the output substantially to that value.

When a push-pull configuration is used in the power converter the differences in the transistor parameters (storage time, delay time, gain), result in unbalanced conduction of the switching transistors. This results in a d-c component which may result in saturation of the output power transformer core. Excessive saturation current may damage the power transistors and reduce efficiency of the energy conversion. One solution which is applied to a single-ended converter is found in U.S. Pat. No. 3,737,756 titled: "Converter Circuit With Balanced Parallel Switching Paths" by Halsey et al., issued July 5, 1973. Here, a separate transformer is used to control the drive currents in the two parallel connected transistors. Electronic control is also described in U.S. Pat. No. 3,859,583 entitled: "Pulse-Width Modulation Converter Circuit Providing Asymmetry Correction And Current Monitoring" by Reed, issued Jan. 7, 1975. Where magnetic control of the power converter is utilized, it has been found that asymmetry correction can be integrated with the voltage regulation by the introduction of additional control windings on the magnetic amplifier in a particular configuration.

Thus, in accordance with a particular embodiment of the invention the d-c to d-c converter may also comprise a circuit for generating a difference signal which is proportional to the difference in average current through the two power transistors. The converter also includes a first pair of windings each individually coupled to one of the two gate windings. Each first pair of windings are connected in series with a separate one of a second pair of windings across the generating means. In addition, the second pair of windings are coupled through two linear transformers to the two gate windings. The polarities of these additional control windings are arranged so that the difference signal tends to alter the firing angle of the magnetic amplifier to balance the average current in the two power transistors without generating an a-c component across these windings.

In accordance with another embodiment of the invention the d-c to d-c converter may also comprise a circuit for generating a differential signal which is proportional to the difference in average current through the two power transistors. The converter also includes a first pair of serially connected windings, each individually coupled to one of the two gate windings; and a pair of opposite conductivity semiconductor loads connected in shunt across the serially connected windings. The circuit also includes means for connecting the differential signal to the inputs to the pair of opposite conductivity semiconductor loads, to turn one of the loads on during each half-cycle, which alters the firing angle of the magnetic amplifier so as to correct for any symmetry unbalance in the average current of the two power transistors.

BRIEF DESCRIPTION OF THE DRAWINGS

Example embodiments of the invention will now be described in conjunction with the accompanying drawings in which.

DESCRIPTION OF THE PREFERRED EMBODIMENTS

Figure 1:
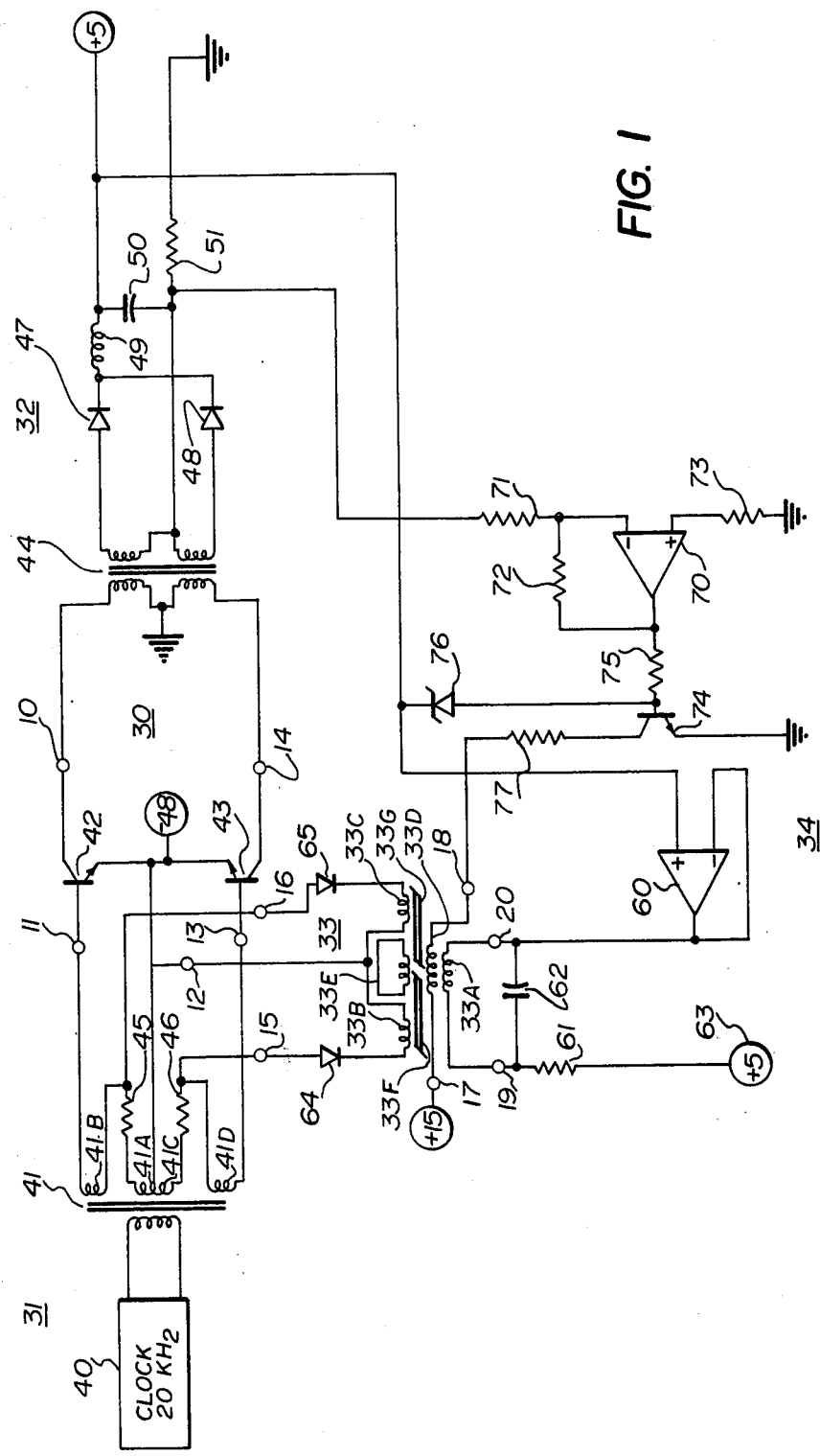
FIG. 1 is a block and schematic circuit diagram of a d-c to d-c power converter utilizing pulse-width modulation control by a magnetic amplifier.
Figure 2:
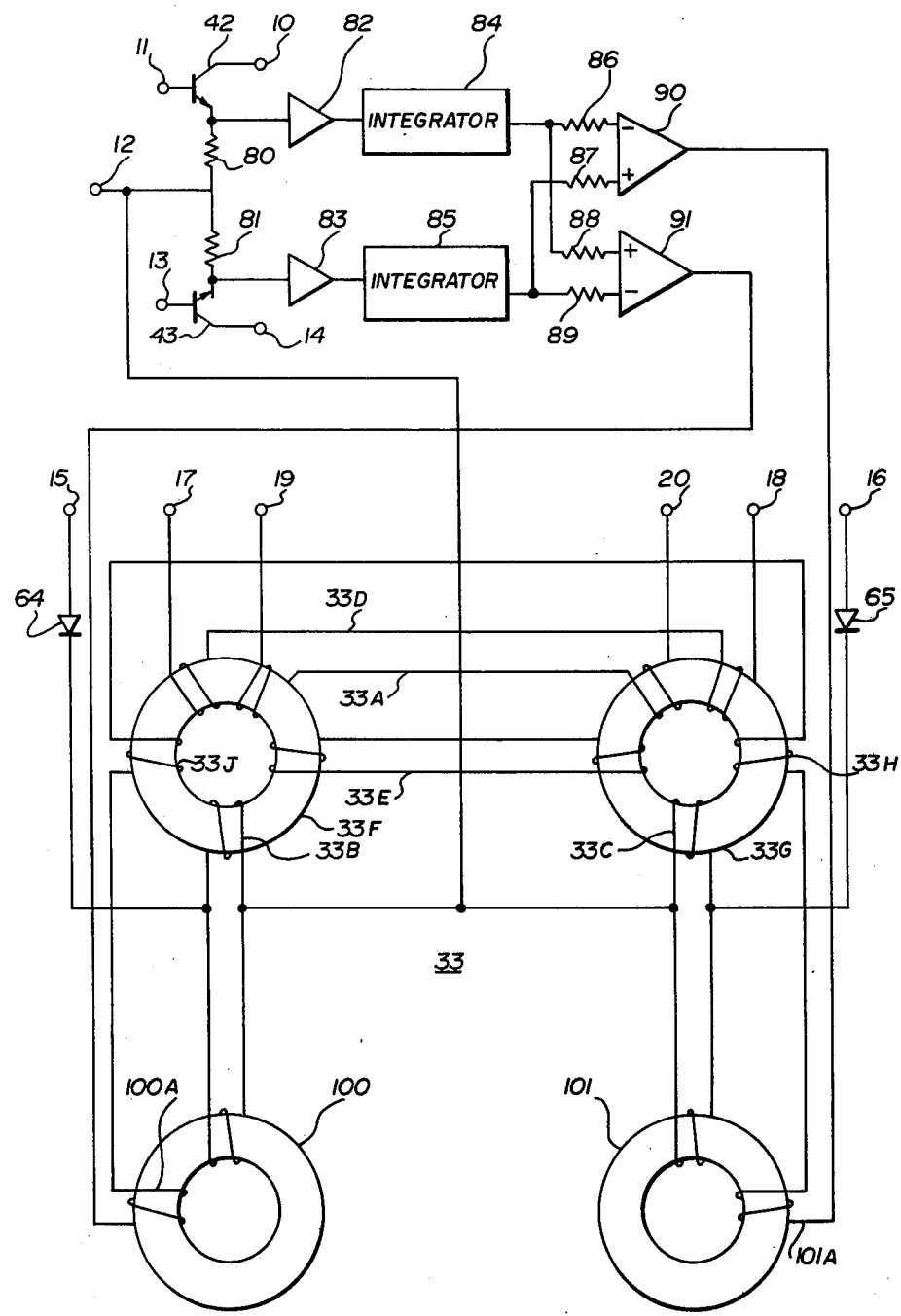
FIG. 2 is a schematic and pictorial diagram of a particular magnetic amplifier and its accompanying control circuitry for providing asymmetry control of the converter illustrated in FIG. 1.
Figure 3:
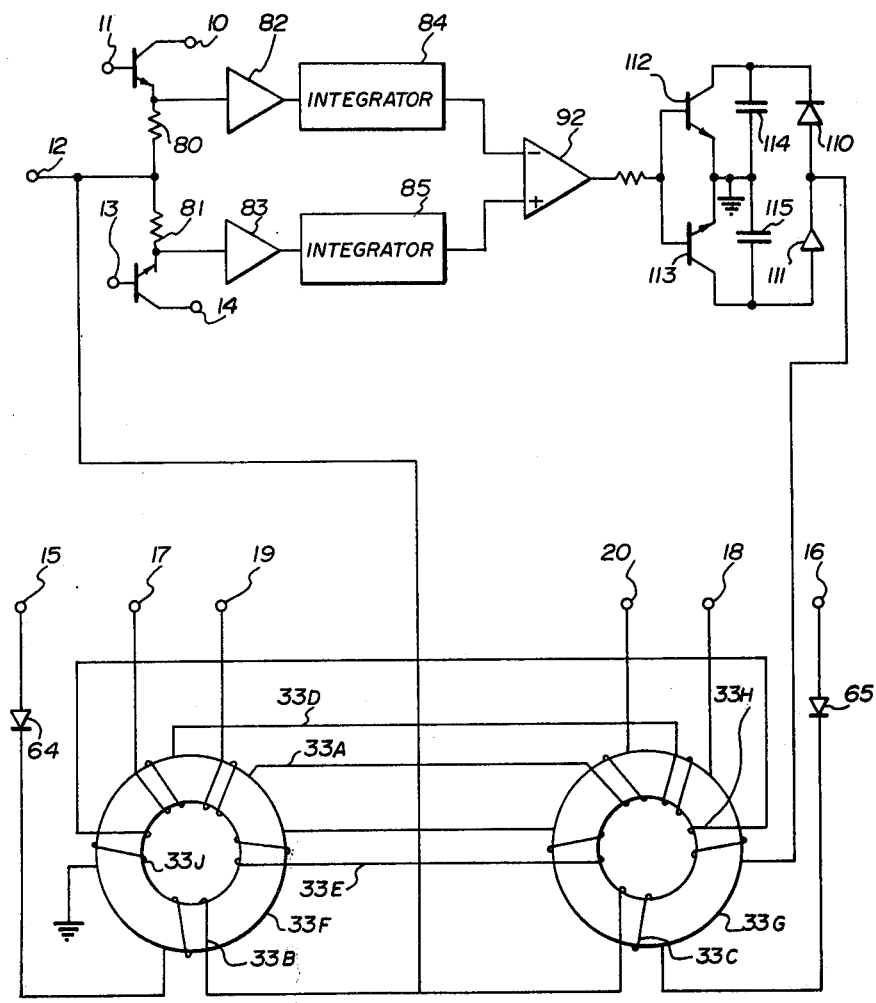
FIG. 3 is a schematic and pictorial diagram of an alternate magnetic amplifier and its accompanying control circuitry which also provides asymmetry control of the converter illustrated in FIG. 1.

FIGS. 2 and 3 illustrate in greater detail alternate embodiments of portions of FIG. 1. The connections between the elements in FIGS. 2 and 3 and those of FIG. 1 are identified by identical reference numerals 10 to 20.

Referring to FIG. 1, the d-c to d-c power converter basically comprises a transformer coupled push-pull converter 30, the input of which is driven from a clock controlled drive circuit 31 and the output of which is coupled through a rectifier and filter network 32 to the output of the converter. In addition, a magnetic amplifier 33 is used to control the pulse-width modulation of the drive signal applied to the converter 30 under control of a control circuit 34. The detailed structure of the power converter will be apparent from the following description of its function and operation.

In the drive circuit 31, the output of a nominal 20 KHz clock 40 is coupled to the primary of a transformer 41. The square-wave output signal on the secondary of transformer 41 alternately drives the push-pull connected power transistors 42 and 43 hard into conduction which switch a source of −48 volts across the primary of an output power transformer 44. In the transformer 41, a larger winding 41A is connected in series opposition with a smaller winding 41B to provide the proper base drive for transistor 42. Similarly, a larger winding 41C is connected in series opposition with a smaller winding 41D to produce the base drive for transistor 43. The purpose of these opposed windings 41A – 41D will become apparent hereinafter. Resistors 45 and 46 limit the base current of the two switching devices 42 and 43.

As detailed above, the power transistors 42 and 43 are connected in a push-pull configuration so that the −48 volt supply is alternately switched across the centre-tapped primary of the output power transformer 44 in the converter 30. In the network 32, the switched output from the secondary of the power transformer 44 is full-wave rectified by the diodes 47 and 48, and after being filtered by inductor 49 and capacitor 50, provides a regulated +5 volt output from the d-c to d-c converter. A small resistor 51 is utilized to monitor the output current as will be described in greater detail hereinafter. To obtain regulation, the output voltage from the converter if fed through an operational amplifier 60 (employing full negative feedback to maintain unity voltage gain), to one side of a control winding 33A in the magnetic amplifier 33. The other side of the control winding 33A is connected through a small resistor 61 to a +5 volt reference source 63. Any difference in voltage between the output of the +5 volt reference source 63 and that of the +5 volt regulated output of the converter will cause a control current to flow in winding 33A of the magnetic amplifier 33.

The magnetic amplifier 33 is a saturable multi-winding current and voltage transformer. Its gate windings 33B and 33C are driven by the square-wave drive signal from the base drive transformer 41 through diodes 64 and 65. This square-wave voltage across windings 33B and 33C is sufficient to saturate the amplifier 33 during each half-cycle. However, saturation of the magnetic amplifier 33 must be controlled in order to provide the necessary base drive for the transistors 42 and 43. This is achieved by passing a current through the control winding 33A in such direction as to delay the firing angle of the amplifier 33. Any change in the +5 volt output creates a change in the differential voltage which increases or decreases the current through the control winding 33A of the magnetic amplifier 33. This has the effect of saturating the transformer 33 earlier or later in the cycle (by altering the firing angle) depending upon the output voltage and load conditions. Upon saturation of the amplifier 33, the impedance of the gate winding 33B or 33C through which current is flowing, is substantially reduced so as to substantially short-circuit the voltage across one or the other of the windings 41A or 41C across the associated one of the resistors 45 or 46. Because the windings 41B and 41D are reverse polarized with respect to the windings 41A and 41C, the base of the conducting transistor 42 or 43 is driven negative into cut-off. The result is a pulse-width modulated waveform to drive the power transistors 42 or 43. Thus during one-half of each 20 KHz cycle of the drive signal, the base of transistor 42 is initially driven into conduction by the positive voltage of the larger winding 41A. Later in the half-cycle when the magnetic amplifier 33 saturates, the winding 41A is effectively short-circuited across the resistor 45 through the diode 65. At this point the negative bias on the smaller winding 41B drives the transistor 42 into cut-off. During this interval, the transistor 43 is held cut off by the negative bias on winding 41C which exceeds the positive bias on winding 41D. However, the effect of any impedance change on winding 33B during saturation of the amplifier 33 is not coupled to the winding 41C because the diode 64 is reverse-biased.

A similar action takes place on the following half-cycle, with the voltages being reversed so that the transistor 43 is driven hard into conduction. The diodes 64 and 65 alternately prevent current from being coupled to the windings 33B and 33C of the magnetic amplifier 33 so that only one power transistor 42 or 43 can conduct at a time depending upon the polarity of the base drive signals from the transformer 41. To provide stable operation of the magnetic amplifier 33, an internal winding 33E coupled between its two cores 33F and 33G as well as the resistor 61 and a capacitor 62 connected to the control winding 33A, cancel any a-c component present in the system.

Over-current protection is provided by sensing a small voltage drop (nominally 50 millivolts) across the resistor 51. This voltage is coupled to an operational amplifier 70 through a resistor 71. A resistor 73 balances the two inputs to the amplifier 70 with respect to ground. The gain of the amplifier 70 is controlled by a feedback resistor 72 so as to turn on a transistor 74 through resistor 75 during an over-current condition, i.e., when the voltage across resistor 51 exceeds a preselected value. This in turn drives a control current via a resistor 77 through a control winding 33D which is so arranged as to alter the firing angle of the magnetic amplifier 33 and thereby sharply reduce the pulse width of the drive signals to the power transistors 42 and 43. This has the effect of reducing the duty cycle and therefore limiting the output current of the converter to a preset level.

The over-voltage protection is controlled by a zener diode 76. If the regulated +5 volt output should increase above the zener voltage the base of transistor 74 is biased on. Current again is drawn through the winding 33D and the current limiting resistor 77. This will cause the on time of transistors 42 and 43 to be shortened thus limiting the output voltage to approximately the zener voltage of diode 76.

Figure 4:
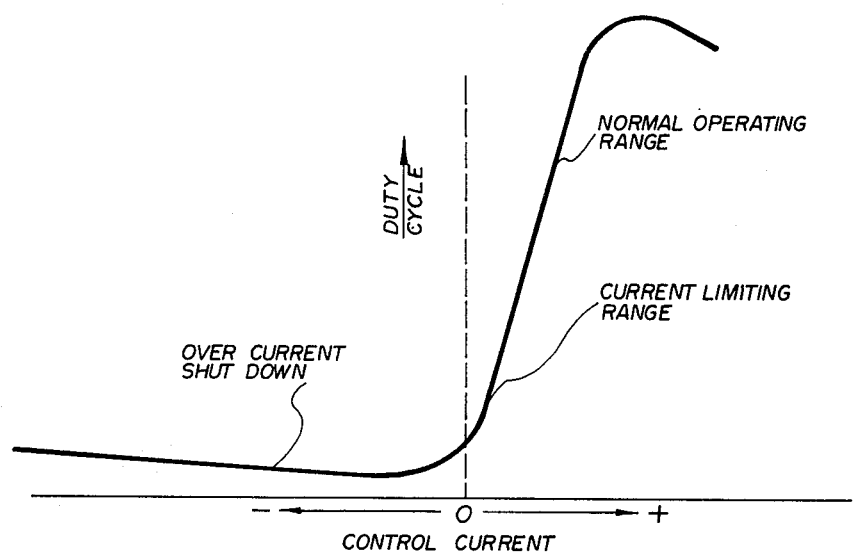
FIG. 4 is a graph of duty cycle vs control current for the magnetic amplifier illustrated in FIG. 1.

A better understanding of the magnetic amplifier control of the converter can be had by reference to FIG. 4 which illustrates the duty cycle of the drive signals applied to the transistors 42 and 43 with varying control current applied to control windings 33A and/or 33D. Under normal operating conditions, a positive control current maintains the duty cycle in the range of 60% to 90%. Under current limiting conditions however, a sharply increased negative control current is introduced on the winding 33D which effectively cancels the positive control current on winding 33A so that the duty cycle of the drive signals to the transistors 42 and 43 drops well below the 60% range.

In an alternate embodiment, the transistor 74 may be replaced by a silicon controlled rectifier (not shown). Under normal load current conditions, the SCR is nonconducting and no current flows through the control winding 33D. Hence the operating point of the magnetic amplifier is determined solely by the current through the control winding 33A. When the load current exceeds the preselected level, the output voltage from the operational amplifier 70 will increase sufficiently to trigger the SCR. The current through the control winding 33D opposes that of control winding 33A and thereby shifts the operating point to an over-current shutdown condition as shown in FIG. 4. The resulting short duty cycle, nominally 5%, limits the power delivered into the short circuit to a safe value. Once the short circuit is removed, the SCR can be manually reset.

In order to balance the drive currents of the two power transistors 42 and 43, by separate control of the pulse width in the two half-cycles, each of the two cores 33F and 33G must be driven either separately, or simultaneously but in opposite directions. However, in either of these cases, there is a-c coupling between cores 33F and 33G introduced by the additional symmetry control windings unless each is driven from a source of high impedance. This a-c loading of the magnetic amplifier 33 would prevent proper performance of the existing control windings and the accompanying symmetry correcting windings. Also, if a high impedance source is used to limit the a-c loading, it results in high power dissipation and low efficiency. This problem has been overcome by two unique circuit configurations which are better understood with reference to schematic FIGS. 2, 3 and the current waveforms of FIGS. 5A and 5B.

Figure 5A:
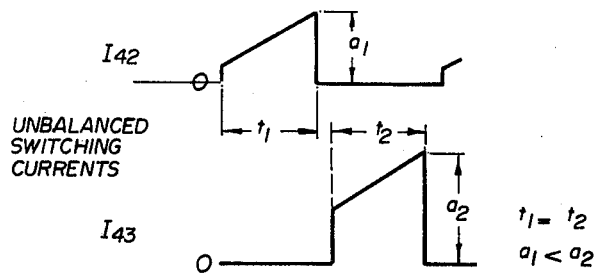
FIGS. 5A and 5B are typical unbalanced and balanced current waveforms respectively, encountered in the d-c to d-c converter of FIG. 1.
Figure 5B:
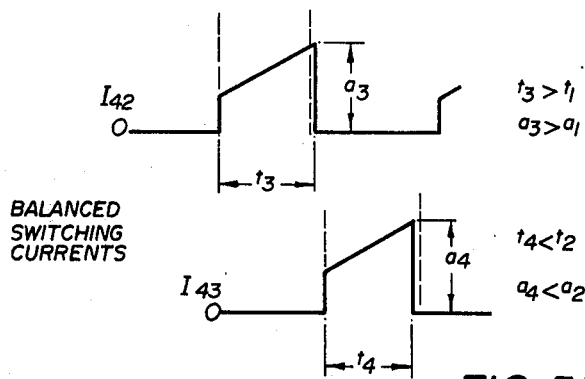

FIG. 5A illustrates the switching currents $I_{42}$ and $I_{43}$ of the two transistors 42 and 43 before correction is applied; and FIG. 5B illustrates these currents after correction is applied. In FIG. 5A the conduction time of the two transistors is equal ($t_1 = t_2$). However, due to differences in their operating characteristics, assume the magnitude of the current $I_{43}$ exceeds that of $I_{42}$ ($a_2 > a_1$). In order to balance the average switching currents, the conduction time $t_1$ must be increased while $t_2$ decreased. This is shown in FIG. 5B where $t_3 > t_1$ and $t_4 < t_2$, and as a result, $a_3 > a_1$ and $a_4 < a_2$. Hence, the average current of the two transistors is now balanced.

In the embodiment illustrated in FIG. 2, switching currents through the transistors 42 and 43 produced voltages across current sensing resistors 80 and 81. These voltages of low magnitude are amplified in amplifiers 82 and 83, and the signals then integrated in integrators 84 and 85 respectively. Between the outputs of integrators 84 and 85 is a differential d-c voltage which is proportional to the degree of unbalance between the switching currents $I_{42}$ and $I_{43}$ in the transistors 42 and 43. This voltage differential is then applied through resistors 86, 87, 88 and 89 to the inputs of differential amplifiers 90 and 91, the outputs of which are coupled to the additional symmetry control windings 33H and 33J in the magnetic amplifier 33 and the windings 100A and 101A of linear transformers 100 and 101.

The function of these additional transformers 100 and 101 will be manifested from the following. Assume that there is a positive voltage on winding 41C (FIG. 1) and transistor 43 is conducting. Under these circumstances a current flows through winding 33B which induces a voltage in each of the windings 33A, 33D and 33E wound on the core 33F. The polarity of the windings 33A and 33D with respect to that of 33E on the core 33G is such as to cancel these induced voltages so that no a-c component appears between terminals 17 and 18, or 19 and 20. However, because the windings 33H and 33J must be wound so as to provide symmetry correction, the induced a-c voltages add rather than cancel.

In order that no a-c component will appear between the outputs of amplifiers 90 and 91, the a-c component from winding 41C is also applied or induced in transformers 100 and 101, across windings 33B and 33C. This in turn induces a-c voltages in windings 100A and 101A which are of such polarity as to cancel the induced a-c voltages on windings 33H and 33J so that no a-c component appears across the output of amplifiers 90 and 91. Consequently, a low impedance source can be utilized to drive the symmetry correction windings 33H and 33J in the magnetic amplifier 33 for symmetry correction without upsetting the operation thereof.

As explained above, saturation of cores 33F and 33G results in the cut-off of transistors 43 and 42 respectively. The saturation point is normally controlled by the d-c control current flowing through the control windings 33A. The added d-c current in the windings 33J and 33H is such as to alter the conduction time of the two transistors as illustrated in FIG. 5B. Thus, the d-c current passing through the windings 33H and 33J tends to reduce the duty cycle of one-half cycle by saturating its associated core earlier and extending the duty cycle in the other half-cycle by saturating its core later. Since the cores of transformers 100 and 101 do not saturate, it is not necessary to consider them from the point of view of d-c magnetization. The differential voltage source tends to pass current through the control windings 33H and 33J such that the voltage difference between the outputs of the integrators 84 and 85 approaches 0 whereby current balancing is achieved.

Referring now to FIG. 3, the portions of the symmetry control circuit which are identical to that of FIG. 2 are identified by identical reference characters. The main difference between the embodiments of FIGS. 2 and 3 is that in FIG. 2 additional transformers 100 and 101 are utilized to balance the a-c induced voltages while in FIG. 3 these induced a-c voltages act as sources of internal magnetic feedback for the magnetic amplifier 33 through which the balancing action is achieved. This is accomplished by utilizing the fact that resistive loading of one or the other of the symmetry correction windings 33H or 33J will cause its associated transformer to fire earlier in the cycle thereby reducing the duty cycle of the associated power transistors 42 or 43. This is achieved at the expense of lower operating efficiency of the magnetic amplifier 33.

Assuming that winding 41A is positive and transistor 42 is conducting a current flows through gate winding 33C which induces serially adding voltages in windings 33H and 33J. The additive voltages in turn forward bias diode 110 during one-half cycle and diode 111 during the other half-cycle. Depending upon the polarity and magnitude from the output of differential amplifier 92, either transistor 112 or 113 will commence to conduct. This in turn acts as a variable resistive load across either the winding 33H or 33J. Passing a d-c pulsating current through these windings tends to magnetize one core and demagnetize the other in the same way as described with reference to FIG. 2. The capacitors 114 and 115 provide d-c storage for the induced voltages during conduction of the diodes 110 or 111. Thus, both circuits of FIG. 2 and 3 provide balancing of the switching currents by integrating the symmetry control with that of the voltage regulation in the magnetic amplifier 33.

1. In a pulse-width modulated d-c to d-c converter comprising:
   a pair of transformer coupled power transistors connected in a push-pull configuration to a source of d-c voltage;
   a drive circuit for alternately switching said transistors into conduction;
   a transformer having a primary coupled to the output of the drive circuit and a center tapped secondary to the inputs to the pair of power transistors for coupling switching signals from the drive circuit to the transistors;
   a rectifier and filter network coupled to the outputs of the pair of power transistors for producing the d-c output voltage of the converter;
   a magnetic amplifier having a pair of serially connected gate windings coupled via alternately conducting diodes across at least part of said secondary winding to substantially short-circuit the switching signals to the power transistors during saturation thereof and thereby alter the duty cycle of said signals;
   said secondary having a larger winding and a smaller winding connected in series opposition to the input to each of said power transistors with each larger winding being coupled through said diodes to a separate one of said gate windings;
   said magnetic amplifier also having a first control winding for controlling said saturation;
   a first control circuit responsive to said d-c output voltage for controlling a first control signal applied to said first control winding to vary the firing angle and hence the saturation interval of said magnetic amplifier so as to maintain a substantially constant output voltage with varying loads;
   the magnetic amplifier additionally having a second control winding; and
   a second control circuit responsive to the output current of the converter, for controlling a second control signal applied to the second control winding to vary the firing angle and hence the saturation interval of said magnetic amplifier so as to limit said output current.

2. A d-c to d-c converter as defined in claim 1 in which the second control circuit is also responsive to said output voltage which exceeds a preselected value to vary the firing angle of said magnetic amplifier to limit the magnitude of said output voltage.

3. In a pulse-width modulated d-c to d-c converter comprising:
   a pair of transformer coupled power transistors connected in a push-pull configuration to a source of d-c voltage;
   a drive circuit for alternately switching said transistors into conduction;
   a transformer having a primary coupled to the output of the drive circuit and a center tapped secondary to the inputs to the pair of power transistors for coupling switching signals from the drive circuit to the transistors;
   a rectifier and filter network coupled to the outputs of the pair of power transistors for producing the d-c output voltage of the converter;
   a magnetic amplifier having a pair of serially connected gate windings coupled via alternately conducting diodes across at least part of said secondary winding to substantially short-circuit the switching signals to the power transistors during saturation thereof and thereby alter the duty cycle of said signals;
   said secondary having a center tapped larger winding, each end of which is series connected through a separate and oppositely polarized smaller winding to an input of one of the two power transistors, the ends of said larger winding being coupled through said diodes to separate ones of said gate windings and the center points of the two windings being connected together;

said magnetic amplifier also having a first control winding for controlling said saturation;

a first control circuit responsive to said d-c output voltage for controlling a first control signal applied to said first control winding to vary the firing angle and hence the saturation interval of said magnetic amplifier so as to maintain a substantially constant output voltage with varying loads;

the magnetic amplifier additionally having a second control winding; and a second control circuit responsive to the output current of the converter, for controlling a second control signal applied to the second control winding to vary the firing angle and hence the saturation interval of said magnetic amplifier so as to limit said output current.

4. In a pulse-width modulated d-c to d-c converter comprising:

a pair of transformer coupled power transistors connected in a push-pull configuration to a source of d-c voltage;

a drive circuit for alternately switching said transistors into conduction;

a transformer having a primary coupled to the output of the drive circuit and a center tapped secondary to the inputs to the pair of power transistors for coupling switching signals from the drive circuit to the transistors;

a rectifier and filter network coupled to the outputs of the pair of power transistors for producing the d-c output voltage of the converter;

a magnetic amplifier having a pair of serially connected gate windings coupled via alternately conducting diodes across at least part of said secondary winding to substantially short-circuit the switching signals to the power transistors during saturation thereof and thereby alter the duty cycle of said signals;

said magnetic amplifier also having a first control winding for controlling said saturation;

a first control circuit responsive to said d-c output voltage for controlling a first control signal applied to said first control winding to vary the firing angle and hence the saturation interval of said magnetic amplifier so as to maintain a substantially constant output voltage with varying loads;

the magnetic amplifier additionally having a second control winding;

a second control circuit responsive to the output current of the converter, for controlling a second control signal applied to the second control winding to vary the firing angle and hence the saturation interval of said magnetic amplifier so as to limit said output current;

means for generating a difference signal which is proportional to the difference in average current through the two power transistors; and a first pair of windings each individually coupled to one of the two gating windings and each connected in series with a separate one of a second pair of windings across said generating means, the second pair of windings being the secondaries of two linear transformers, each primary of which is connected across one of the gating windings, the polarities of said windings being arranged so that the difference signal tends to alter the firing angle of the magnetic amplifier to balance said average current in the two power transistors and the secondaries cancel any a-c component generated in said first pair of windings.

5. In a pulse-width modulated d-c to d-c converter comprising:

a pair of transformer coupled power transistors connected in a push-pull configuration to a source of d-c voltage;

a drive circuit for alternately switching said transistors into conduction;

a transformer having a primary coupled to the output of the drive circuit and a centre tapped secondary to the inputs to the pair of power transistors for coupling switching signals from the drive circuit to the transistors;

a rectifier and filter network coupled to the outputs of the pair of power transistors for producing the d-c output voltage of the converter;

a magnetic amplifier having a pair of serially connected gate windings coupled via alternately conducting diodes across at least part of said secondary winding to substantially short-circuit the switching signals to the power transistors during saturation thereof and thereby alter the duty cycle of said signals;

said magnetic amplifier also having a first control winding for controlling said saturation;

a first control circuit responsive to said d-c output voltage for controlling a first control signal applied to said first control winding to vary the firing angle and hence the saturation interval of said magnetic amplifier so as to maintain a substantially constant output voltage with varying loads;

the magnetic amplifier additionally having a second control winding;

a second control circuit responsive to the output current of the converter, for controlling a second control signal applied to the second control winding to vary the firing angle and hence the saturation interval of said magnetic amplifier so as to limit said output current;

means for generating a difference signal which is proportional to the difference in average current through the two power transistors;

a first pair of serially connected windings, each individually coupled to one of the two gating windings;

a pair of opposite conductivity semiconductor loads connected in shunt across said serially connected windings; and means for connecting the differential signal to the inputs to said pair of opposite conductivity semiconductor loads to turn on one of said loads during each half-cycle, so as to correct for any symmetry unbalance in the average current of the two power transistors.

* * * * *